United States Patent
Papageorgiou et al.

(10) Patent No.: US 8,605,844 B2
(45) Date of Patent: Dec. 10, 2013

(54) APPARATUS AND METHOD FOR RECEIVING IMPERFECTLY PHASE COMPENSATED ELECTROMAGNETIC SIGNALS

(75) Inventors: Andrew Papageorgiou, Lower Cambourne (GB); Jason Woodard, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 388 days.

(21) Appl. No.: 12/462,394

(22) Filed: Aug. 3, 2009

(65) Prior Publication Data
US 2010/0074241 A1 Mar. 25, 2010

(30) Foreign Application Priority Data

Aug. 4, 2008 (GB) .................................. 0814252.3

(51) Int. Cl.
*H04B 1/10* (2006.01)
(52) U.S. Cl.
USPC ............ 375/350; 375/148; 375/229; 375/150

(58) Field of Classification Search
USPC .......................................................... 375/350
See application file for complete search history.

(56) References Cited

U.S. PATENT DOCUMENTS

| | | | | |
|---|---|---|---|---|
| 6,157,612 A * | 12/2000 | Weerackody et al. | ........ | 370/215 |
| 7,356,089 B2 * | 4/2008 | Jia et al. | .......... | 375/267 |
| 2005/0069024 A1* | 3/2005 | Li et al. | .......... | 375/148 |
| 2005/0180493 A1* | 8/2005 | Hooli et al. | .......... | 375/148 |
| 2008/0039030 A1* | 2/2008 | Khan et al. | .......... | 455/101 |

\* cited by examiner

*Primary Examiner* — Lhong Yu
(74) *Attorney, Agent, or Firm* — Louis J. Franco; Law Office of Louis J. Franco

(57) ABSTRACT

A signal receiver is configured for receiving signals from multiple antennas, wherein the signal from one of the antennas is phase compensated relative to the signal from another of the antennas. The receiver comprises (i) an equalizer configured to equalize signals received from the antennas in accordance with a determined equalization vector and (ii) a processor for determining the equalization vector. The processor is configured to determine the equalization vector in dependence on (i) a first channel estimate for a first channel from one of the antennas to the receiver and (ii) a phase-adjusted version of a second channel estimate for a second channel from another of the antennas to the receiver.

8 Claims, 1 Drawing Sheet

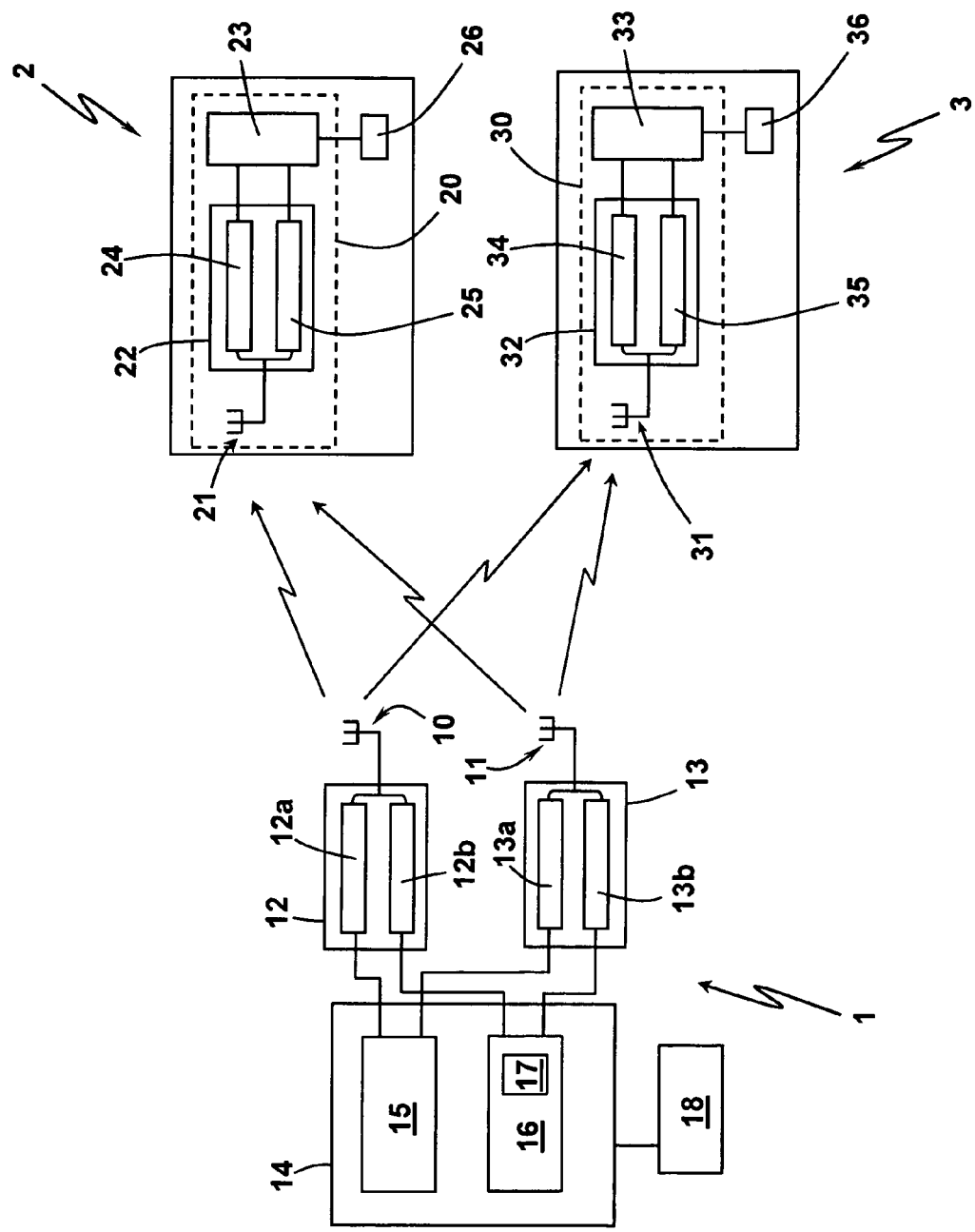

APPARATUS AND METHOD FOR RECEIVING IMPERFECTLY PHASE COMPENSATED ELECTROMAGNETIC SIGNALS

Priority based on British Patent Application Serial No. GB0814252.3 filed Aug. 4, 2008, and entitled "RECEIVING IMPERFECTLY PHASE COMPENSATED SIGNALS" is claimed. The entirety of the disclosure of the previous foreign application, including the drawings and claims, is incorporated herein by reference as if set forth fully in the present application.

BACKGROUND

Embodiments of the present invention relate generally to electromagnetic-signal receivers, and more particularly to receivers implementing weighted signal equalization.

Transmitter diversity is a known technique for reducing the effects of fading in a wireless communications system. Transmitter diversity can be used for chip equalization, and especially to maintain orthogonality between spreading codes in systems such as the WCDMA (Wideband Code-division Multiple Access) system.

A wireless communication channel in which the signal reflects off different objects in its path before reaching the receiver is said to exhibit multipath propagation. "Fading" is a consequence of multipath propagation. As the various reflected signals take different paths, they may arrive at the receiver at different times and can combine to cause destructive interference, resulting in signal fading at the receiver or causing interference between signals that were intended to be mutually orthogonal.

As is known to those ordinarily skilled in the relevant arts, "transmitter diversity" was developed in order to compensate for effects such as fading and interference. In a wireless communication system featuring transmitter diversity, one station (for instance a base station) is equipped with two or more antennas, all of which are used to transmit a signal to a particular other station (for instance a mobile station). The signal transmitted from each antenna is the same. However, the signal is transmitted from a second antenna with a phase delay relative to its transmission from a first antenna. The phase delay is chosen with the aim that the signal from the second antenna ("the second signal") arrive at the mobile station correctly in phase with the signal from the first antenna ("the first signal"), causing constructive interference, and hence mitigating any fading otherwise experienced at the mobile station.

The signal paths may be regarded as individual channels. In order to calculate how much phase offset must be applied to the second signal, the transmitting system requires access to the transfer function for both signal paths (channels). Such transfer functions are alternatively referred to as channel estimates. The channel estimates for the channel between the first antenna and the mobile station (channel estimate $H_1$) and for the channel between the second antenna and the mobile station (channel estimate $H_2$) are calculated. The channel estimates are then used to calculate the required phase compensation for the second antenna in order to reduce signal fading or interference, and thereby increase the signal to noise ratio at the receiver.

When more than one mobile station is configured to receive a particular signal from the base station, a problem arises relative to a system such as that described above. More specifically, when the base station is configured to correctly phase compensate the signal transmitted for a particular mobile station in the manner described, the signals received by the other mobile stations are unlikely to be correctly phase compensated. Instead, the signal received by other mobile stations will be incorrectly phase compensated and may result in an even lower quality signal than that of a system that does not employ transmitter diversity.

Accordingly, there exists a need for a system and method for improving phase compensation relative to signal systems in which a base station transmits signals to multiple mobile stations.

SUMMARY

According to one aspect of the present invention, there is provided a signal receiver for receiving signals from multiple antennas, the signal from one of the antennas being phase compensated relative to the signal from another of the antennas. In various embodiments, the receiver comprises (i) an equalizer configured to equalize signals received from the antennas in accordance with a determined equalization vector and (ii) a processor for determining the equalization vector. In alternative versions, the processor is configured to determine the equalization vector in dependence on (i) a first channel estimate for a first channel from one of the antennas to the receiver and (ii) a phase-adjusted version of a second channel estimate for a second channel from another of the antennas to the receiver.

According to another aspect of the present invention, there is provided a method for receiving signals from multiple antennas, the signal from one of the antennas being phase compensated relative to the signal from another of the antennas. In various versions, the method comprises determining an equalisation vector in dependence on (i) a first channel estimate for a first channel from one of the antennas to the receiver and (ii) a phase-adjusted version of a second channel estimate for a second channel from another of the antennas to the receiver; equalizing signals received from the antennas in accordance with the determined equalisation vector.

BRIEF DESCRIPTION OF THE DRAWINGS

Embodiments of the invention will now be described, by way of example only, with reference to the accompanying drawings in which:

FIG. 1 illustrates an embodiment of the invention including a base station and mobile stations.

DETAILED DESCRIPTION

In the illustrative system of FIG. 1, a base station 1 includes first and second antennas 10 and 11 which are connected, respectively, to first and second radio frequency (RF) front-ends 12 and 13. The radio frequency front ends 12 and 13 have respective transmit paths 12b and 13b and respective receive paths 12a and 13a. Among other functions, the transmit paths 12b and 13b "upconvert" signals to radio frequency, and amplify them for transmission, while the receive paths 12a and 13a amplify and "downconvert" received radio signals to baseband. The transmit paths 12b and 13b, and receive paths 12a and 13a, are connected to the reception and transmission functions 15 and 16 of a baseband processor 14. The transmission function 16 forms signals for transmission. The reception function 15 processes received signals to derive traffic data carried in the received signals.

The transmission function 16 includes a diversity processor 17. When a mobile station reports channel estimates to the base station 1, those channel estimates are received at the reception function 15 and passed (i.e., communicated) to the diversity processor 17. The diversity processor 17 also receives data that is to be transmitted. It processes the data to be transmitted in dependence on the channel estimates to form signals that drive the transmit paths 12b and 13b in such a way as to cause the antennas 10 and 11 to transmit spatial diversity signals of the appropriate form to the mobile station. This may involve applying a phase offset to one signal relative to the other with the aim that the signals interfere constructively at the receiver. Alternatively, it may involve transmitting signals from the antennas that are incoherent but that can nevertheless be interpreted by the mobile station using appropriate diversity reception techniques.

In addition to base station 1, FIG. 1 shows mobile stations 2 and 3. The mobile stations 2 and 3 include respective radio transceivers 20 and 30. Transceiver 20 comprises an antenna 21, a radio frequency front-end 22, which handles transmission and reception, and a baseband section 23. The radio frequency front-end 22 includes a transmit path 24 and a receive path 25. Analogously, transceiver 30 comprises an antenna 31, a radio frequency front-end 32 for handling transmission and reception, and a baseband section 33. The radio frequency front-end 32 includes a transmit path 34 and a receive path 35. The baseband sections 23 and 33 perform baseband processing of received signals and generate signals for transmission by the antennas 21 and 31, and the radio frequency front-ends 22 and 32, with which the baseband sections 23 and 33 are respectively associated. The baseband sections 23 and 33 can perform the necessary processing for diversity reception (e.g. by chip equalisation), for calculating channel estimates and for generating messages to report channel estimates to the base station 1 in accordance with the techniques described above.

In various versions, at least one of the baseband processors 14, 23, and 33 is a digital signal processor programmed to perform the appropriate functions. Moreover, each of the processors could be coupled to a respective memory 18, 26, or 36 which store instructions for execution by the processors 14, 23 and 33 to allow them to behave in the desired way.

With continued reference to FIG. 1, the mobile stations 2 and 3 form channel estimates relative to the channels between them and each of the antennas 10 and 11 of the base station 1. The channel estimates could be formed in various ways, but initially, during the operation of one illustrative implementation, the transmission function 16 of the base station 1 generates a pilot or training signal of a predetermined form. The diversity processor 17 then applies a known function to the pilot signal to pass the signal to the antennas 10 and 11. The known function could involve transmitting the pilot signal, with zero phase offset from both antennas 10 and 11 simultaneously. The base station 1 transmits the pilot signal in that form to the mobile stations 2 and 3 through antennas 10 and 11. The mobile stations 2 and 3 receive those signals, and render channel estimates from them based on their "knowledge" of the pilot signal's form. The mobile stations 2 and 3 report the rendered channel estimates back to the base station 1, where they are stored by the diversity processor 17 for use in forming transmissions to the appropriate mobile station. Instead of reporting the channel estimates, the mobile stations 2 and 3 could report other data that is a function of the channel estimates (e.g. a phase offset that the channel estimates imply would cause constructive interference at the mobile station) or data from which the channel estimates could be calculated.

As described above, once the channel estimates are rendered and communicated to the diversity processor 17, the diversity processor 17 can transmit signals in such a way as to optimize the signals for a particular mobile station (e.g., 2 or 3). In the example to be discussed below, this could involve transmitting coherent signals with a phase compensation value C applied so that the signal transmitted from antenna 10 is offset in phase by C relative to the signal transmitted from antenna 11. Compensation value C may be chosen to minimize the apparent phase difference between the signals received from antennas 10 and 11 when received at the particular mobile station.

A phase-compensated signal may be a multi-user signal that needs to be received at multiple mobile stations. For example, the base station 1 could use channel estimates from mobile station 2 to form C, but the transmitted signal might need to be received at mobile station 3, as well as at mobile station 2. However, since the propagation paths to mobile station 3 will be different from those to mobile station 2, it is unlikely that the signal will be correctly phase compensated for mobile station 3. It can therefore be beneficial for mobile stations whose channel estimates have not been used to form C to adopt a strategy for receiving signals from the base station 1 that takes account of imperfect phase compensation.

In the illustrative implementation described below, a mobile station employs MMSE (minimum mean squared error) equalization on the signal received from the base station 1. The MMSE equalizer makes use of weights derived from knowledge of the channels between the base station 1 and the mobile station. In one version employing MMSE equalization, in order to at least partially accommodate the fact that the received signal is imperfectly phase compensated for mobile station 3, for example, the MMSE weights are calculated in a manner that is dependent on a combination of the corrected and uncorrected signal, using an estimate of the proportion of the signal that is affected by closed loop diversity. More specifically, by way of illustrative example, the MMSE weights used at mobile station 3 are calculated as a function of:

a. channel estimates made by the mobile station 3;
 b. the value C in use by the base station 1;
 c. the proportion of the multi-user signal affected by the closed loop diversity phase compensation (which could be decided using any one of a number of methods);
 d. a determination of the non-compensated and compensated component of the signal received by the mobile station 3 (calculated from variables a. through c. above); and
 e. a predetermined shaped noise array calculated from the co-variance of the front end filters, typically a raised-cosine filter (RRC) filter, but possibly including the effects of other digital and analogue filter stage(s).

The intention is that, once the signal is processed by the MMSE at mobile station 3 in accordance with the calculated MMSE weights, the resulting received signal is of a higher quality than would otherwise be the case. In this way, mobile stations such as mobile station 3 for which the phase compensation at transmission is not correct can receive the multi-user signal with improved error rates.

An illustrative algorithm applied by, for example, mobile station 3 will now be described in more detail. It will be appreciated that multiple mobile stations could implement a similar algorithm.

Channel Estimates

According to one illustrative version relative to mobile station 3, mobile station 3 calculates channel estimates $H_1$ and $H_2$. Channel estimate $H_1$ describes the channel between antenna 10 and mobile station 3 and channel estimate $H_2$ describes the channel between antenna 11 and mobile station 3. $H_1$ and $H_2$ are n-point vectors.

The phase offset value C in use by the base station 1 is reported to the mobile stations 2 and 3. The value C could take any form, but, in one example, is described by $$\frac{\pi}{4} + n \times \frac{\pi}{2} \text{ where } n = 0, 1, 2, 3.$$

The mobile station 1 estimates a proportion value P representing the proportion (on a scale of 0 to 1) of the received signal that is affected by transmission diversity. In normal conditions, proportion value P is expected to be less than 0.5. Proportion value P can be estimated in a number of ways. Illustrative examples of how P can be estimated include:

1. P could be estimated based on the proportion of the power in the received signal that is affected by transmission diversity. Mobile station 3 could estimate this by using a parallel multiple-code power estimator to determine the received total power and the power of each of the phase compensated components of the signal (e.g. user codes).
2. P could be estimated based on the proportion of the components of the signal that are phase compensated. For example, the mobile station could estimate P from knowledge of the number of codes/multi-codes transmitted.
3. P could be estimated based on information signalled by the base station 1. That information could be:
    a. user or transfer-specific power information; or
    b. Information specific to the base station 1.

To calculate the MMSE weights, the mobile station 1 calculates arrays describing the regular component (A) and the phase-compensated component (B) of the received signal. The regular component is found by multiplying the conjugate and the transpose of $H_1$ and summing that product with the product of the conjugate and the transpose of $H_2$. As the proportion of the signal which is phase compensated is P, the proportion of the signal which is not phase compensated is given as (1−P) times that sum. Therefore, the regular component A of the received signal is estimated as:

$$A = (1-P) \cdot (\overline{H}_1 \times H_1^T + \overline{H}_2 \times H_2^T)$$

Phase compensated component B is based on $H_1$ and a phase compensated $H_2$, compensated by amount C, as calculated above. Component B is calculated as the product of P, the conjugate of the sum of $H_1$ and C multiplied by $H_2$, and the transpose of the sum of $H_1$ and C multiplied by $H_2$. Therefore, the phase compensated component B of the received signal is estimated as:

$$B = P \cdot \overline{(H_1 + C \cdot H_2)} \cdot (H_1 + C \cdot H_2)^T$$

In order to compensate for the colouring of the noise during the filtering stage of the signal decoding, A and B are moderated by the noise co-variance scaled RC shaped noise vector R. Using R, the weights $\{w_c\}$ to be applied to the equalizer are then calculated as follows:

$$\{w_c\} = \text{inv}(A+B+R)(\overline{H}_1 + C \cdot \overline{H}_2)$$

Those weights $\{w_c\}$ can then be applied in the digital domain to produce an equalized version of the samples received by, for example, the baseband processor 32 of mobile station 3.

Based on the foregoing description, in conjunction with FIG. 1, it will be appreciated that embodiments of the present invention can allow for transmit diversity signals to be received with an improved signal to noise ratio.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description, it will be evident to a person skilled in the art that various modifications may be made within the scope of the invention.

What is claimed is:

1. A signal receiver for receiving signals from multiple antennas of a transmitter operable to transmit signals from one of its antennas phase compensated relative to signals from another of its antennas, the receiver comprising:
    an equalizer configured to equalize signals received from the antennas of a transmitter in accordance with a determined equalization vector; and
    a processor for determining the equalization vector, the processor being configured to determine the equalization vector in dependence on (i) a first channel estimate for a first channel from a first antenna of that transmitter to the receiver, (ii) a phase-adjusted version of a second channel estimate for a second channel from a second antenna of that transmitter to the receiver, the phase-adjusted second channel estimate being determined by means of a received value of phase compensation reported by the transmitter, (iii) a non-phase-compensated signal estimate, and (iv) a phase-compensated signal estimate.

2. A signal receiver as claimed in claim 1, wherein the processor is configured to determine the equalization vector in dependence on the non-phase-compensated signal estimate representing the sum of (i) the product of the conjugate of the first channel estimate and the transpose of the first channel estimate and (ii) the product of the conjugate of the second channel estimate and the transpose of the second channel estimate, weighted by an estimate of the non-phase-compensated component of the signals received by the receiver.

3. A signal receiver as claimed in claim 2, wherein the processor is configured to determine the equalization vector in dependence on the phase-compensated signal estimate representing the product of (i) the conjugate of the sum of the first channel estimate and the phase-adjusted version of the second channel estimate and (ii) the transpose of the sum of the first channel estimate and the phase-adjusted version of the second channel estimate, weighted by an estimate of the phase-compensated component of the signals received by the receiver.

4. A signal receiver as claimed in claim 3, wherein the processor is configured to determine the equalization vector in dependence on the product of (i) the inverse of a sum of the phase-compensated signal estimate and the non-phase-compensated signal estimate and (ii) the sum of the conjugate of the first channel estimate and a phase-adjusted conjugate of the second channel estimate.

5. A signal receiver as claimed in claim 4, wherein the processor is configured to determine the equalization vector in dependence on the product of (i) the inverse of a sum of the phase-compensated signal estimate, the non-phase-compensated signal estimate and a noise estimate and (ii) the sum of the conjugate of the first channel estimate and a phase-adjusted conjugate of the second channel estimate.

6. A signal receiver as claimed in claim 2, wherein the estimate of at least one of (i) the phase-compensated component of the signals received by the receiver and (ii) the nonphase-compensated component of the signals received by the receiver is based on information signalled by the transmitter.

7. A signal receiver as claimed in claim 1, wherein the receiver is a receiver for receiving Wideband CDMA signals.

8. A method for receiving signals from multiple antennas of a transmitter operable to transmit signals from one of its antennas phase compensated relative to signals from another of its antennas, the method comprising:
  receiving at a receiver a value of phase compensation applied by a transmitter;
  determining an equalization vector in dependence on (i) a first channel estimate for a first channel from a first antenna of that transmitter to the receiver, (ii) a phase-adjusted version of a second channel estimate for a second channel from a second antenna of that transmitter to the receiver, the phase-adjusted second channel estimate being determined by means of the received value of phase compensation reported by the transmitter, (iii) a non-phase-compensated signal estimate, and (iv) a phase-compensated signal estimate; and
  equalizing signals received from the antennas of that transmitter in accordance with the determined equalization vector.

\* \* \* \* \*